(12) United States Patent
Dunk et al.

(10) Patent No.: US 11,556,891 B2
(45) Date of Patent: Jan. 17, 2023

(54) OPERATIONS SYSTEM FOR COMBINING INDEPENDENT PRODUCT MONITORING SYSTEMS TO AUTOMATICALLY MANAGE PRODUCT INVENTORY AND PRODUCT PRICING AND AUTOMATE STORE PROCESSES

(71) Applicant: Accenture Global Solutions Limited, Dublin (IE)

(72) Inventors: Steven Dunk, Buckinghamshire (GB); Thomas Harden, Bromley (GB)

(73) Assignee: Accenture Global Solutions Limited, Dublin (IE)

( * ) Notice: Subject to any disclaimer, the term of this patent is extended or adjusted under 35 U.S.C. 154(b) by 199 days.

(21) Appl. No.: 17/108,727

(22) Filed: Dec. 1, 2020

(65) Prior Publication Data

US 2021/0182775 A1    Jun. 17, 2021

Related U.S. Application Data

(60) Provisional application No. 62/947,613, filed on Dec. 13, 2019.

(51) Int. Cl.
| | |
|---|---|
| *G06Q 10/00* | (2012.01) |
| *G06Q 10/08* | (2012.01) |
| *G06K 7/10* | (2006.01) |
| *G06K 7/14* | (2006.01) |
| *G06K 19/06* | (2006.01) |
| *G06K 19/07* | (2006.01) |
| *G06Q 30/02* | (2012.01) |
| *G07G 3/00* | (2006.01) |

(Continued)

(52) U.S. Cl.
CPC .......... *G06Q 10/087* (2013.01); *G06F 16/51* (2019.01); *G06K 7/10297* (2013.01); *G06K 7/1413* (2013.01); *G06K 19/06028* (2013.01); *G06K 19/0723* (2013.01); *G06Q 10/06315* (2013.01); *G06Q 30/0206* (2013.01); *G06Q 50/265* (2013.01); *G06V 10/751* (2022.01); *G07G 3/003* (2013.01); *G06K 2007/10504* (2013.01)

(58) Field of Classification Search
CPC ............ G06Q 10/087; G06Q 30/0206; G06Q 10/06315; G06F 16/51
USPC ........................................................ 705/7.25
See application file for complete search history.

(56) References Cited

U.S. PATENT DOCUMENTS 10,878,394 B1 * 12/2020 Gjertson ............ G06Q 30/0238
10,949,797 B2 * 3/2021 Elazary ................ G06Q 10/087
(Continued)

*Primary Examiner* — Ahshik Kim
(74) *Attorney, Agent, or Firm* — Harrity & Harrity, LLP

(57) ABSTRACT

In some implementations, a device may receive data identifying products and encoded data identifying smart tags of the products. The device may map the data and the encoded data to generate encoded product data. The device may receive encoded data provided by smart tags of products received by a store. The device may receive images of the products. The device may compare the encoded data and the encoded product data to identify a set of the products received by the store. The device may correlate the images with the set of the products. The device may process the correlated data to identify locations of the set of the products in the store. The device may generate an instruction to relocate a product to a new location and may provide the instruction to a device, associated with the store, to cause the product to be relocated to the new location.

20 Claims, 10 Drawing Sheets

(51) Int. Cl.
    *G06Q 50/26*          (2012.01)
    *G06F 16/51*          (2019.01)
    *G06Q 10/06*          (2012.01)
    *G06V 10/75*          (2022.01)

(56) References Cited

U.S. PATENT DOCUMENTS

| | | | |
|---|---|---|---|
| 11,132,637 B1* | 9/2021 | Hahn | H04W 4/35 |
| 11,410,122 B1* | 8/2022 | DesJardien | G06V 10/141 |
| 11,416,811 B2* | 8/2022 | Bradley | G06Q 10/087 |
| 2022/0114537 A1* | 4/2022 | Griffin | G06V 20/20 |
| 2022/0164814 A1* | 5/2022 | Baghestani | G06Q 40/025 |

* cited by examiner

OPERATIONS SYSTEM FOR COMBINING INDEPENDENT PRODUCT MONITORING SYSTEMS TO AUTOMATICALLY MANAGE PRODUCT INVENTORY AND PRODUCT PRICING AND AUTOMATE STORE PROCESSES

CROSS-REFERENCE TO RELATED APPLICATION

This Patent Application claims priority to U.S. Provisional Patent Application No. 62/947,613, filed on Dec. 13, 2019, and entitled "DIGITAL STORE OPERATIONS PLATFORM FOR COMBINING INDEPENDENT PRODUCT MONITORING SYSTEMS TO AUTOMATICALLY MANAGE PRODUCT INVENTORY AND PRODUCT PRICING AND AUTOMATE STORE PROCESSES." The disclosure of the prior Application is considered part of and is incorporated by reference into this Patent Application.

BACKGROUND

Certain entities (e.g., off-price retailers) have large product inventories and rapidly fluctuating prices (e.g., due to products being discounted). These retailers struggle with accurately managing the product inventories and product pricing.

SUMMARY

In some implementations, a method includes receiving, by a device, product data identifying products associated with an entity and encoded data identifying smart tags of the products; mapping, by the device, the product data and the encoded data to generate encoded product data; receiving, by the device, particular encoded data provided by particular smart tags of particular products received by a store of the entity; receiving, by the device, image data identifying images of the particular products received by the store; comparing, by the device, the particular encoded data and the encoded product data to identify a set of the products received by the store; correlating, by the device, the image data with the set of the products to generate correlated data; processing, by the device, the correlated data, with a visual recognition model, to identify one or more locations of the set of the products in the store; generating, by the device, an instruction to relocate a product, of the set of the products, from one of the one or more identified locations and to a new location; and providing, by the device, the instruction to a user device or a server device, associated with the store, to cause the product to be relocated to the new location.

In some implementations, a device includes one or more memories; and one or more processors, communicatively coupled to the one or more memories, configured to: receive product data identifying products associated with an entity and encoded data identifying smart tags of the products; map the product data and the encoded data to generate encoded product data; receive particular encoded data provided by particular smart tags of particular products received by a store of the entity; receive image data identifying images of the particular products received by the store; compare the particular encoded data and the encoded product data to identify a set of the products received by the store; correlate the image data with the set of the products to generate correlated data; process the correlated data, with a visual recognition model, to identify one or more locations of the set of the products in the store; generate an instruction to relocate a product, of the set of the products, from one of the one or more identified locations and to a new location; provide the instruction to a user device or a server device, associated with the store, to cause the product to be relocated to the new location; assign prices to the particular products when the particular encoded data is received; and provide data identifying the prices to the user device or the server device, to cause the user device or the server device to provide the data identifying the prices to the particular smart tags associated with particular products.

In some implementations, a non-transitory computer-readable medium storing a set of instructions includes one or more instructions that, when executed by one or more processors of a device, cause the device to: receive product data identifying products associated with an entity and encoded data identifying smart tags of the products; map the product data and the encoded data to generate encoded product data; receive particular encoded data provided by particular smart tags of particular products received by a store of the entity; receive image data identifying images of the particular products received by the store; compare the particular encoded data and the encoded product data to identify a set of the products received by the store; correlate the image data with the set of the products to generate correlated data; process the correlated data, with a visual recognition model, to identify one or more locations of the set of the products in the store; determine a price change for one or more products of the set of the products in the store; generate an instruction to update one or more smart tags, of the one or more products, with the price change; and provide the instruction to a user device or a server device, associated with the store, to cause the user device or the server device to automatically update the one or more smart tags, of the one or more products, with the price change.

DETAILED DESCRIPTION

Figure 1A:
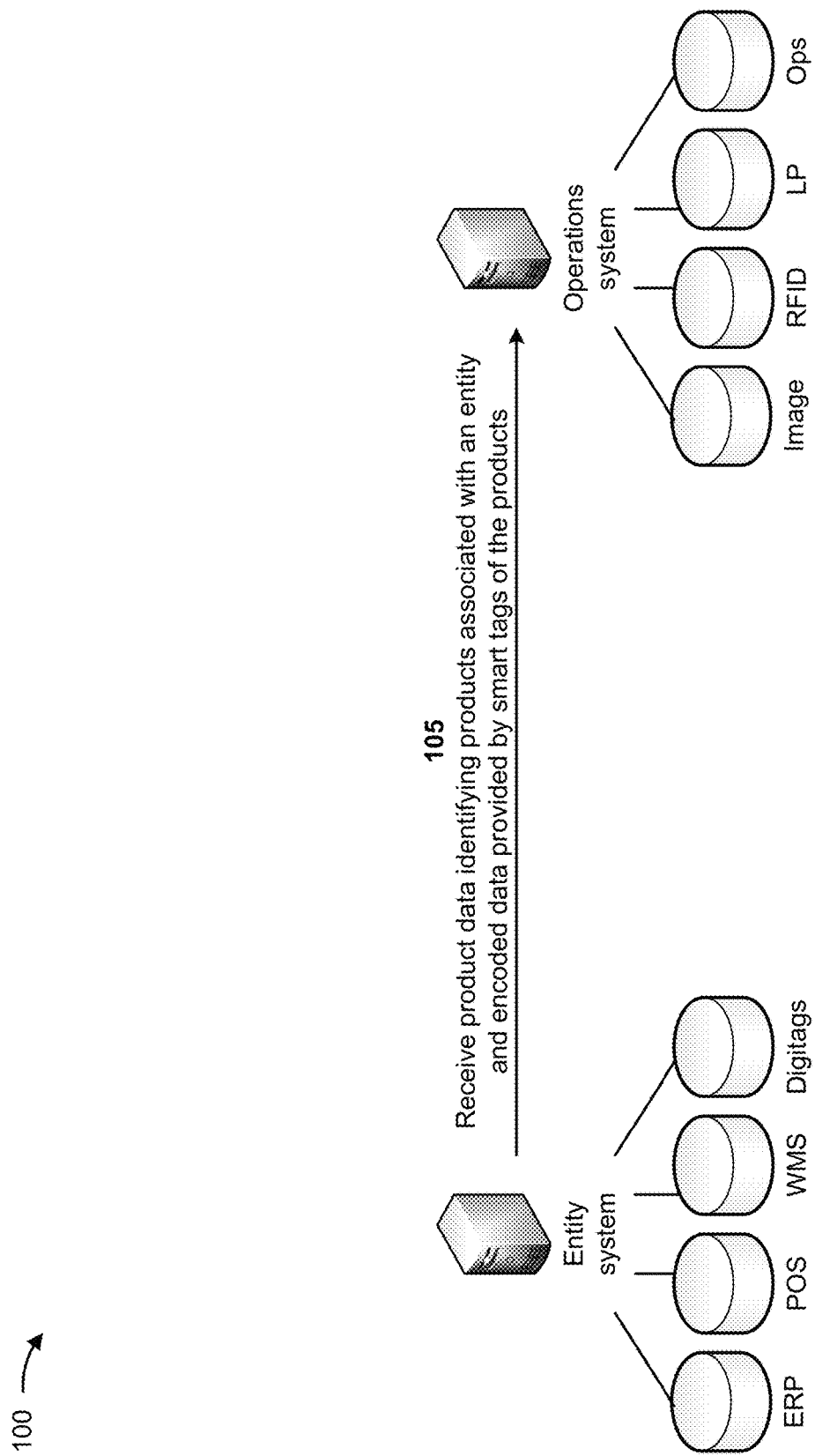
FIGS. 1A-1G are diagrams of an example implementation described herein.

The following detailed description of example implementations refers to the accompanying drawings. The same reference numbers in different drawings may identify the same or similar elements.

Currently, retailers utilize numerous independent systems to monitor and control parts of a retail enterprise. Unfortunately, the independent systems require manual manipulation and generate errors and inefficiencies. Due to complexities of the independent systems, learning how to utilize the independent systems may be difficult and may require a significant amount of training. Sales associates, marketing agents, and/or other business personnel utilize complex navigation tools and forms to execute everyday tasks. Such users need training and assistance to navigate through the independent systems and to understand different workflows. This, in turn, wastes computing resources (e.g., processing resources, memory resources, communication resources, and/or the like), networking resources, human resources, and/or the like associated with training users to utilize the independent systems, delays caused by untrained users of the independent systems, correcting mistakes caused by untrained users of the independent systems, and/or the like.

Some implementations described herein relate to an operations system that combines independent product monitoring systems to automatically manage product inventory and product pricing and automate store processes. For example, the operations system may receive product data identifying products associated with an entity and encoded data identifying smart tags of the products. The operations system may map the product data and the encoded data to generate encoded product data. The operations system may receive particular encoded data provided by particular smart tags of particular products received by a store of the entity. The operations system may receive image data identifying images of the particular products received by the store. The operations system may compare the particular encoded data and the encoded product data to identify a set of the products received by the store. The operations system may correlate the image data with the set of the products to generate correlated data. The operations system may process the correlated data, with a visual recognition model, to identify one or more locations of the set of the products in the store. The operations system may generate an instruction to relocate a product, of the set of the products, from one of the one or more identified locations and to a new location. The operations system may provide the instruction to a user device or a server device, associated with the store, to cause the product to be relocated to the new location.

In this way, the operations system combines independent product monitoring systems to automatically manage product inventory and product pricing and automate store processes. The operations system improves profitability of entities by eliminating errors caused by manual processes, incomplete product inventory knowledge, use of out-of-date information for decision making, and/or the like. Furthermore, the operations system assists retailers in preventing loss through theft and misplaced product inventory. The operations system provides entities with a wholistic view of enterprises of the entities. The operations system may utilize intelligent technologies (e.g., smart tags, tag readers, Internet of Things (IoT) devices, and/or the like) to replace existing product inventory processes. This, in turn, conserves computing resources, networking resources, human resources, and/or the like that would otherwise have been wasted in utilizing less efficient technologies and/or manually performing existing inventory processes.

FIGS. 1A-1G are diagrams of an example 100 associated with combining independent product monitoring systems to automatically manage product inventory and product pricing and automate store processes. As shown in FIGS. 1A-1G, example 100 includes an entity system, a user device, and a server device associated with an operations system. The entity system may include data structures (e.g., databases, tables, lists, and/or the like), server devices, user devices, and/or the like associated with an entity that provides an inventory of products. In some implementations, the entity system may be associated with an enterprise resource planning (ERP) data structure (e.g., that stores data identifying cash, raw materials, production capacity, orders, purchase orders, payroll, and/or the like associated with the entity), a point of sale (POS) data structure (e.g., that stores POS data for products of the entity), a warehouse management system (WMS) data structure (e.g., that stores data identifying weights, dimensions, case packs, automatic identification codes, manufacture dates, lot codes, and/or the like associated with the products), and a digitags data structure (e.g., that stores data identifying digital tags associated with the products).

The server device may include a device that collects and/or determines product data identifying products associated with an entity and encoded data identifying smart tags (e.g., radio frequency identification (RFID) tags) of the products. The user device may include a laptop computer, a mobile telephone, a desktop computer, and/or the like. The server device may include a device that manages products sold by a store of the entity. The operations system may include a system that combines independent product monitoring systems to automatically manage product inventory and product pricing and automate store processes.

As shown in FIG. 1A, and by reference number 105, the operations system receives product data identifying products associated with an entity and encoded data provided by smart tags of the products from the enterprise system (e.g., from one or more of the ERP data structure, the POS data structure, the WMS data structure, and the digitags data structure). In some implementations, the product data includes data identifying the products manufactured by the entity and stored in warehouses of the entity (e.g., data identifying names of the products, bar codes associated with the products, dimensions of the products, quantities of the products, costs of the products, and/or the like). The operations system may receive the product data based on providing a request for the product data to the enterprise system, periodically (e.g., daily, weekly, monthly, and/or the like), and/or based on an occurrence of an event (e.g., a change in a quantity of a product, a change in a cost of a product, an arrival of a new product, a discontinuation of a product, and/or the like).

The encoded data may include data records created based on scanning barcodes associated with the products. For example, the operations system may cause barcodes associated with the products to be scanned (e.g., with an infrared camera, a camera, a bar code reader, and/or the like) and may create data records (e.g., encoded data) based on information received from scanning the barcodes (e.g., a UPC code). In some implementations, the encoded data includes product sizes for sized products (e.g., a dress size, a shirt size, and/or the like). The product sizes may be input by a user and/or included in the information obtained by scanning the barcodes.

In some implementations, the encoded data includes one or more images of the products. For example, the operations system may cause single images or sets of images of the products to be captured (e.g., with a camera) and/or stored as encoded data. In such implementations, the images may be utilized to train a visual recognition model that may identify products based on images.

In some implementations, the encoded data includes information associated with smart tags (e.g., digitags, radio frequency identification (RFID) tags, and/or the like) associated with the products. For example, the operations system may cause smart tags to be attached to the products and encoded with product data, and may cause information associated with the smart tags (e.g., a smart tag identifier (e.g., a serial number), the information obtained from scanning bar codes, and/or the like) associated with the products to be stored as encoded data.

In some implementations, the operations system may encode the smart tags with a station encoder (e.g., that encodes, on the smart tags, at least product identifiers, department and size information, smart tag identifiers, and/or the like). The operations system may generate and/or may receive (e.g., based on providing a request to the enterprise system, periodically, based on an occurrence of an event, and/or the like) the encoded data when the products are at a warehouse and prior to being provided to stores. In some implementations, the operations system may cause the products to be scanned when leaving the warehouse. The operations system may receive the encoded data based on the products being scanned and may update the encoded data to indicate that the products are in transit to particular stores.

Figure 1B:
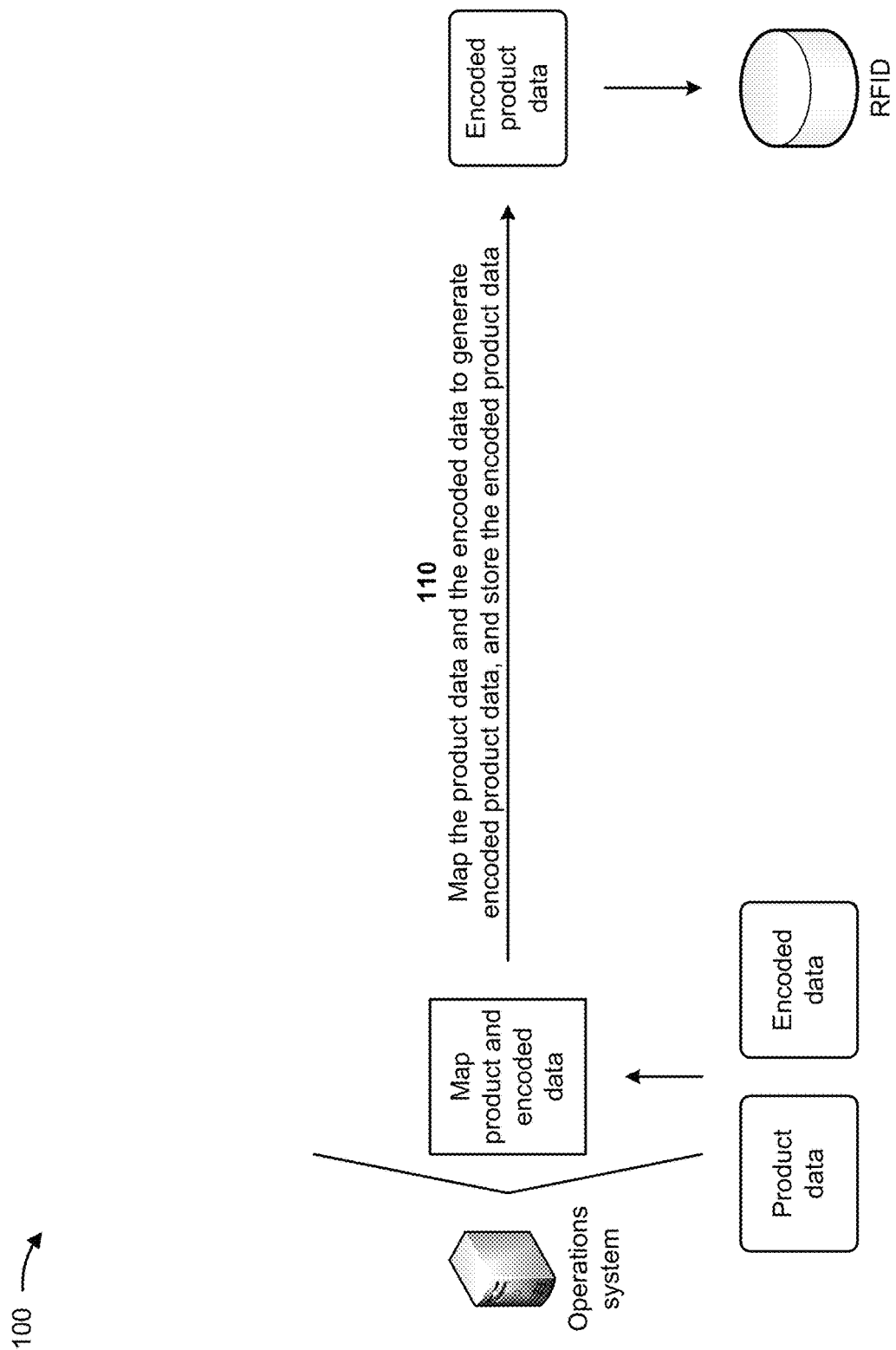

As shown in FIG. 1B, and by reference number 110, the operations system maps the product data and the encoded data to generate encoded product data and stores the encoded product data. The operations system may obtain encoded data associated with a product. The operations system may identify a smart tag associated with the product (e.g., a smart tag identifier) and information associated with the product (e.g., a UPC code) based on the encoded data. The operations system may determine product data associated with the product based on the information obtained by scanning the bar code. For example, the operations system may obtain the product data based on accessing a data structure (e.g., a database, a table, a list, and/or the like) storing information mapping smart tag identifiers and/or UPC codes to product data. The operations system may generate encoded product data by mapping the encoded data associated with the product to the product data associated with the product. The operations system may store the encoded product data in a data structure (e.g., a database storing information mapping ERP data, smart tag identifiers, UPC codes, and/or the like).

Figure 1C:
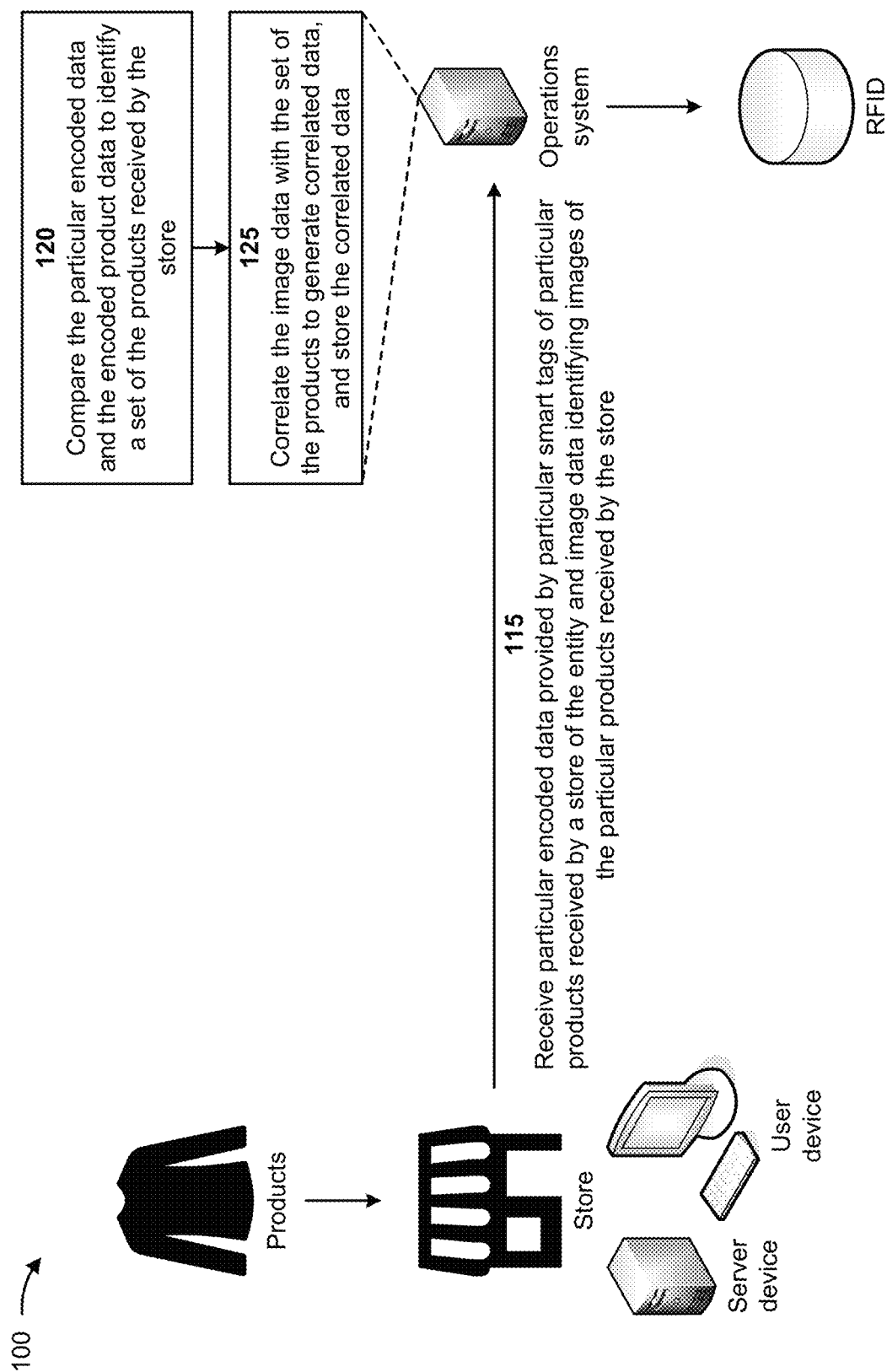

As shown in FIG. 1C, and by reference number 115, the operations system receives particular encoded data provided by particular smart tags of particular products received by a stored of the entity and image data identifying images of the particular products received by the store. As an example, when a product arrives at a store (e.g., from the warehouse), the smart tag associated with the product may be read, a bar code associated with the product may be scanned, and/or the like to obtain encoded data associated with the product. In some implementations, the encoded data includes image data associated with the product. Alternatively, and/or additionally, the operations system may cause an image of the product to be captured based on the product arriving at the store. The operations system may receive the encoded data and the image data based on the encoded data being obtained and/or the image of the product being captured.

In some implementations, the operations system assigns prices to the particular products based on receiving the particular encoded data. The operations system may provide data identifying the assigned prices to a user device or a server device, associated with the store, to cause the user device or the server device to provide the data identifying the assigned prices to the particular smart tags associated with particular products.

In some implementations, the operations system generates a digital shelf user interface based on the image data. The digital shelf user interface may include the images of the particular products received by the store. The operations system may provide the digital shelf user interface to a user device or a server device, associated with the store, to cause the user device or the server device to display the digital shelf user interface (e.g., to a customer of the store). In some implementations, the digital shelf user interface allows a customer to select a particular product displayed via the digital shelf user interface. The digital shelf user interface may cause product information to be displayed, the product to be purchased, related products to be displayed, and/or the like based on the user selecting the particular product.

As shown by reference number 120, the operations system compares the particular encoded data and the encoded product data to identify a set of the products received by the store. For example, the operations system may compare a smart tag identifier included in the encoded data to smart tag identifiers mapped to product data (e.g., encoded product data) to identify product data associated with the set of the products received by the store. The operations system may identify the set of the products received by the store based on the identified product data (e.g., based on a set of product identifiers included in the identified product data).

As shown by reference number 125, the operations system correlates the image data with the set of the products to generate correlated data and stores the correlated data. The operations system may identify a set of image data associated with the set of the products. For example, the image data for a product, of the set of the products, may be included in the encoded data associated with the product and/or may include information identifying the product. The operations system may associate the image data associated with the set of the products with encoded product data associated with the set of the products to correlate the image data with the set of the products. The operations system may store correlated data that includes information associating the image data associated with the set of the products with encoded product data associated with the set of the products in a data structure.

Figure 1D:
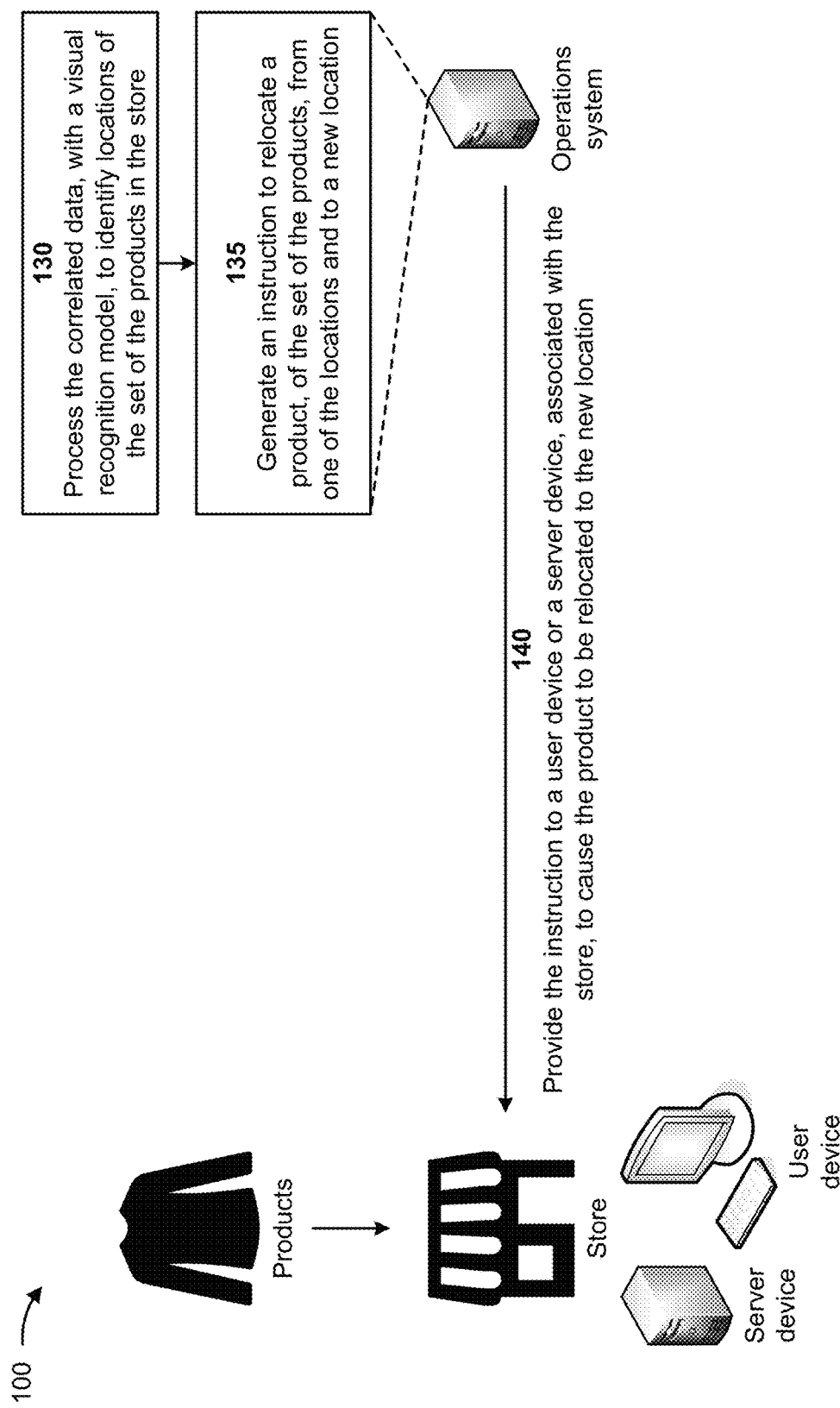

As shown in FIG. 1D, and by reference number 130, the operations system processes the correlated data, with a visual recognition model, to identify locations of the set of the products in the store. In some implementations, the operations system may obtain image data associated with locations of products in the store. For example, the operations system may cause a set of cameras to capture images of products within the store and the cameras may provide image data corresponding to the captured images to the operations system. The operations system may provide the received image data and the image data associated with the set of the products as inputs to a visual recognition model. The visual recognition model may process the input image data to generate an output indicating locations of products of the set of the products in the store.

Alternatively, and/or additionally, when the set of the products arrive at the store, the operations system may provide the encoded data associated with the set of the products to user devices and/or server devices associated with the store. The user devices and/or the server devices may receive the encoded data and may update the encoded data to indicate that the set of the products have been received, the set of the products are displayed at particular locations in the store, the set of the products are associated with particular prices, and/or the like. The user devices and/or the server devices may provide the updated encoded data to the operations system. The operations system may determine the locations of products of the set of the products based on the updated encoded data.

In some implementations, the operations system generates a user interface that includes data identifying the one or more locations of products included in the set of the products in the store. The operations system may provide the user interface to a user device or a server device associated with the store.

As shown by reference number 135, the operations system generates an instruction to relocate a product, of the set of the products, from one of the locations and to a new location. The operations system may determine to relocate a product, of the set of the products, from one of the locations and to a new location based on a process, a policy, and/or the like of the store. The new location may be associated with markdown products, products associated with a particular department, products associated with a particular size, and/or the like. For example, the operations system may determine to relocate the product to the new location based on determining that a price of the product has been reduced or marked down, based on determining that the product is located in an incorrect department, based on determining that the product is located in an incorrect size area (e.g., the product is a size large shirt and is located in an area associated with size medium shirts), based on a smart tag issue, and/or the like.

As shown by reference number 140, the operations system provides the instruction to a user device or a server device, associated with the store, to cause the product to be relocated to the new location. In some implementations, the operations system may provide a product finder application to the user device and the server device associated with the store. The product finder application may enable the user device and/or the server device to automatically provide prices to the products when the products are received at the store, to receive product pricing updates (e.g., markdowns, exception prices, and/or the like) for products remaining in the store, and/or the like. The product finder application may enable the store (e.g., an employee of the store) to be aware of attention products, marked down products by location, thumbnail images of the products, to quickly locate products, to execute store processes, to capture product inventory in the store, and/or the like. The operations system may provide the instruction to the user device or the server device via the product finder application to cause a store employee, a robot, a drone, and/or the like to move the product to the new location as per store processes (e.g., based on markdown, an incorrect department area, an incorrect size area, a digital tag issue, and/or the like).

Figure 1E:
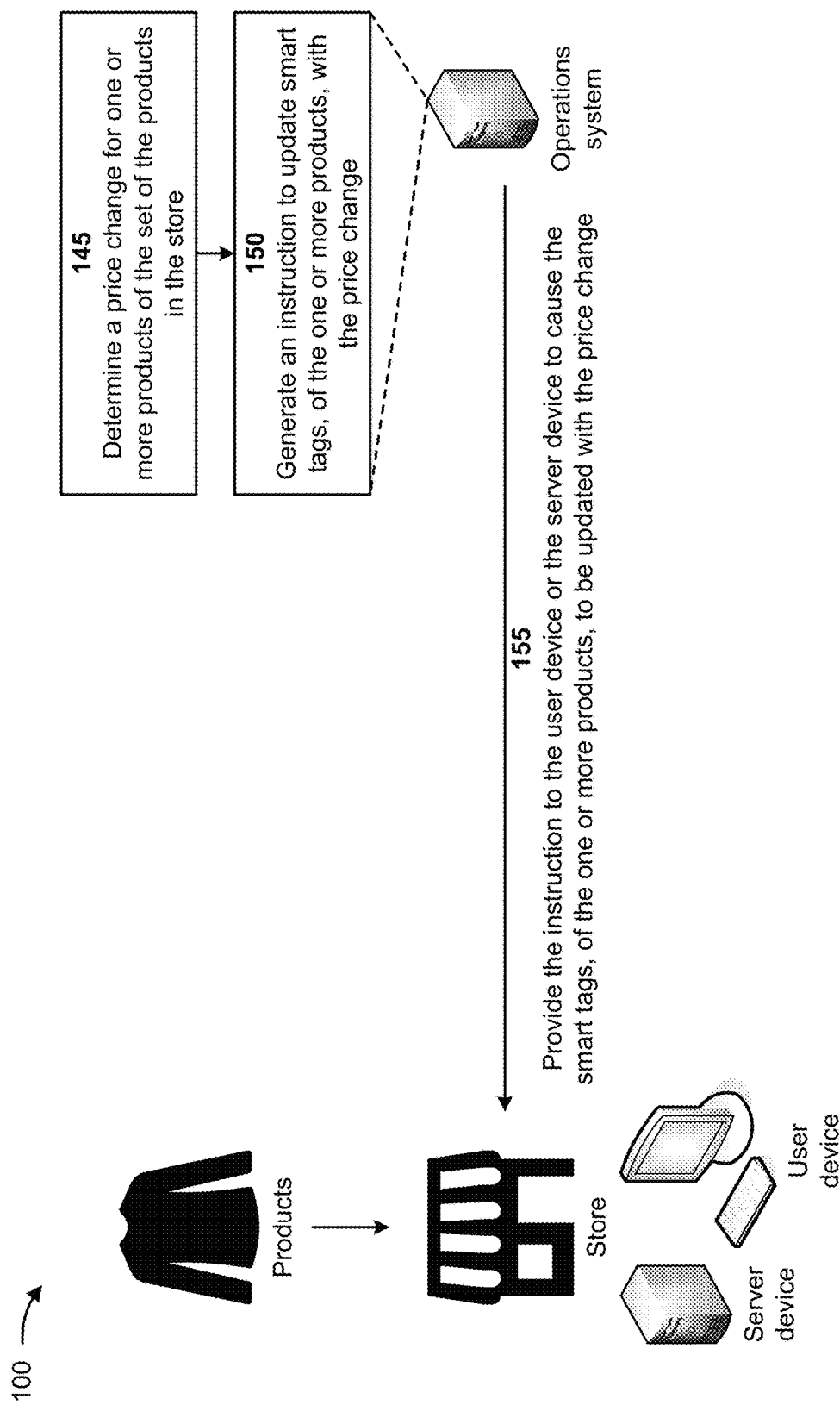

As shown in FIG. 1E, and by reference number 145, the operations system determines a price change for one or more products of the set of the products in the store. In some implementations, the operations system determines the price change for the one or more products based on information received from a user device and/or a server device associated with the store. For example, the operations system may provide a store manager application to the user devices and the server devices associated with the store. The store manager application may enable the user devices and/or the server devices to display a store manager dashboard that includes data associated with the store, the product inventory, the product pricing, task management, task actuals versus standards, activity sequence recommendations, retail insights, cross-store reporting, inbound products, and/or the like. The store manage may input information indicating a price change for the one or more products via a store manager application executing on a particular user device. The store manager application may cause the particular user device to provide the information indicating the price change for the one or more products to the operations system.

As shown by reference number 150, the operations system generates an instruction to update smart tags, of the one or more products, with the price change. The operations system may identify encoded product data associated with the one or more of the products. The operations system may identify one or more smart tags associated with the one or more of the products based on the identified encoded product data. The operations system may generate an instruction to update the identified one or more smart tags with the price change based on the one or more smart tags being associated with the one or more of the products. As shown by reference number 155, the operations system provides the instruction to the user device or the server device to cause the smart tags, of the one or more products, to be updated with the price change.

Figure 1F:
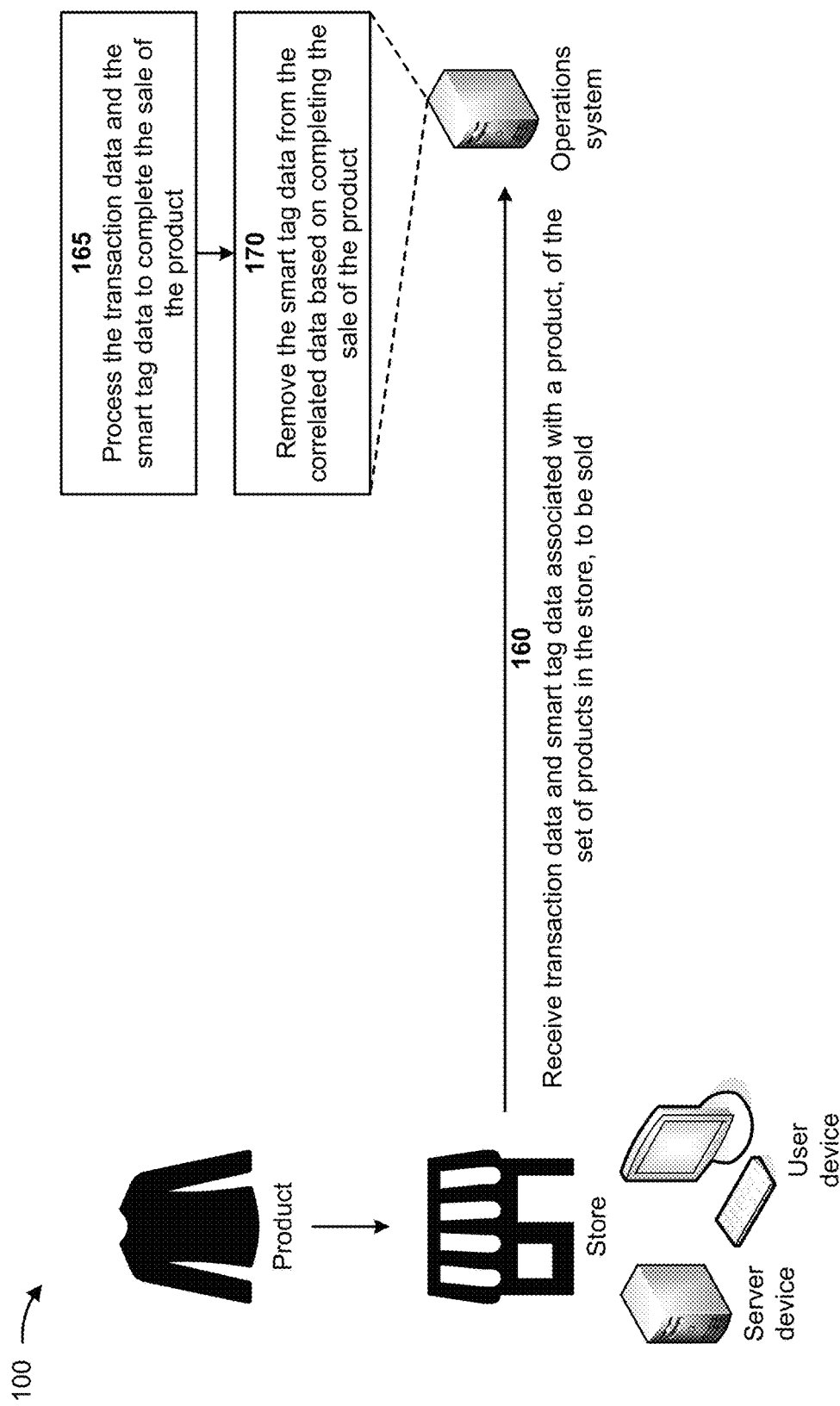

In some implementations, the operations system enables a self-checkout process. For example, as shown in FIG. 1F, and by reference number 160, the operations system receives transaction data and smart tag data associated with a product, of the set of products, in the store, to be sold. For example, the operations system may receive a notification indicating that a smart tag associated with a product, of the set of the products in the store, has been removed from the product in order to sell the product. The operations system may provide, based on the notification, a request for transaction data and smart tag data associated with the product. The operations system may receive the transaction data and the smart tag data associated with the product based on the request. As shown by reference number 165, the operations system processes the transaction data and the smart tag data to complete the sale of the product.

In some implementations, the operations system may update the correlated data based on completing the sale of the product. For example, as shown by reference number 170, the operations system updates the correlated data by removing the smart tag data associated with the product from the correlated data based on completing the sale of the product.

Figure 1G:
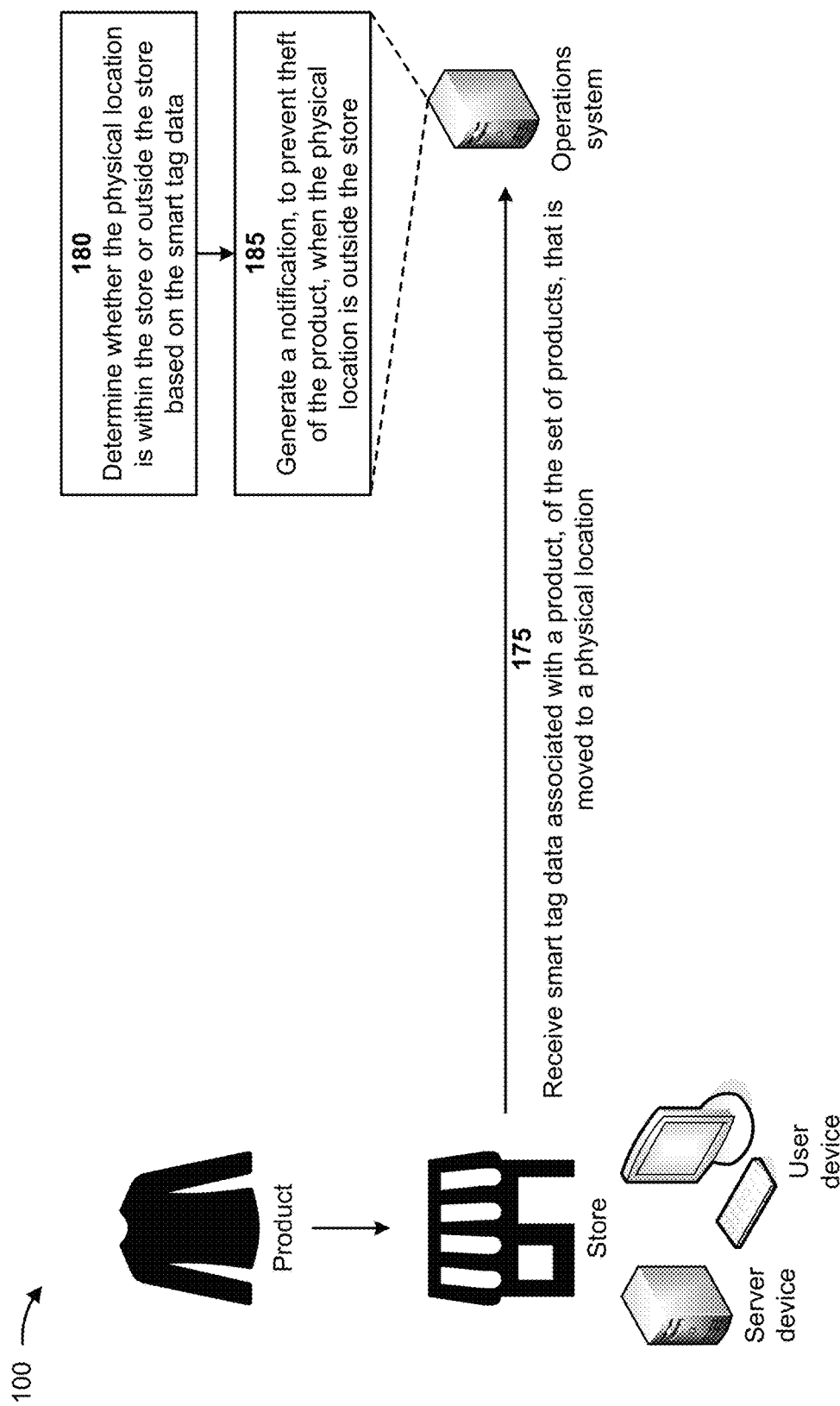

As shown in FIG. 1G, and by reference number 175, the operations system receives smart tag data associated with a product, of the set of products, that is moved to a physical location. The store may include a plurality of sensors (e.g., smart tag readers) positioned at various locations, such as on a shelf, at the end of an aisle, at an entrance to a dressing room, at an entrance of the store, at an exit of the store, in a parking lot of the store, and/or the like. A sensor, of the plurality of sensors, may read the smart tag associated with the product as the product is being moved to the physical location. The sensor may provide smart tag data to the operations system based on reading the smart tag associated with the product. The smart tag data may include information identifying the sensor (e.g., a serial number), information identifying the smart tag, information identifying a location of the sensor, and/or the like.

As shown by reference number 180, the operations system determines whether the physical location is within the store or outside the store based on the smart tag data. For example, the operations system may determine a location of the sensor based on the information identifying the location of the sensor included in the smart tag data. Alternatively, and/or additionally, the operations system may determine the location of the sensor based on the information identifying the sensor. For example, the operations system may determine the location of the sensor based on accessing a data structure storing information mapping sensors to physical locations within and/or outside of the store.

The operations system may determine whether the physical location is within the store or outside the store based on the location of the sensor. For example, the operations system may determine that the physical location is within the store when the location of the sensor is on a shelf in the store, at the entrance of a dressing room, at the end of an aisle in the store, and/or the like. The device may provide data identifying the physical location to a user device or a server device, associated with the store, when the physical location is within the store.

The operations system may determine that the physical location is outside the store when the location of the sensor is at an exit of the store, in a parking lot of the store, and/or the like. As shown by reference number 185, the operations system may generate a notification, to prevent theft of the product, when the physical location is outside the store. The notification may include information identifying the physical location, information identifying the product, information identifying a time associated with the product being moved to the physical location, and/or the like. The operations system may provide the notification to the user device or the server device to prevent theft of the product. For example, the operations system may provide the notification to a user device associated with a loss prevention department, a security guard, a store manager, and/or the like.

In some implementations, the operations system may enable maintenance of the smart tags associated with the products in the store. For example, the operations system may provide a request for battery statuses to smart tags associated with the products in the store. The operations system may receive, based on the request, the battery statuses of the smart tags. The operations system may determine that a particular smart tag has a battery issue based on the battery statuses. The operations system may cause the particular smart tag to be replaced or provided with a new battery based on determining that the particular smart tag has the battery issue. For example, the operations system may provide a notification to a user device associated with a store employee to cause the store employee to replace the particular smart tag or provide the particular smart tag with a new battery.

In this way, the operations system combines independent product monitoring systems to automatically manage product inventory and product pricing and automate store processes. The operations system eliminates errors caused by manual processes, incomplete product inventory knowledge, use of out-of-date information for decision making, and/or the like. Furthermore, the operations system assists retailers in preventing loss through theft and misplaced product inventory. The operations system may utilize intelligent technologies (e.g., smart tags, tag readers, IoT devices, and/or the like) to replace existing product inventory processes. This, in turn, conserves computing resources, networking resources, human resources, and/or the like that would otherwise have been wasted in training users to utilize the independent systems, delays caused by untrained users of the independent systems, correcting mistakes caused by untrained users of the independent systems, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
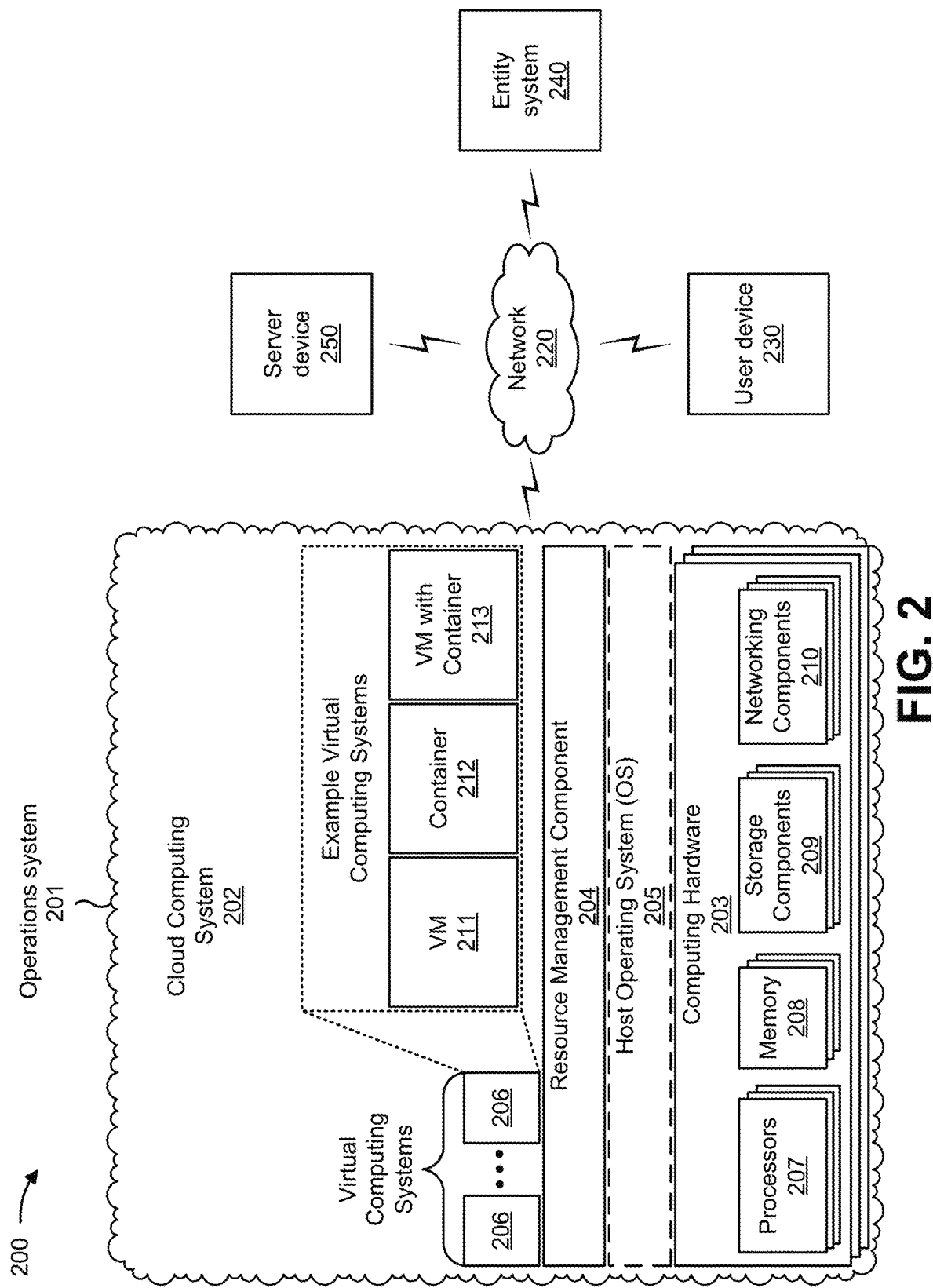
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an operations system 201, which may include one or more elements of and/or may execute within a cloud computing system 202. The cloud computing system 202 may include one or more elements 203-213, as described in more detail below. As further shown in FIG. 2, environment 200 may include a network 220, a user device 230, an entity system 240, and/or a server device 250. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the operations system 201 may include one or more elements 203-213 of the cloud computing system 202, may execute within the cloud computing system 202, and/or may be hosted within the cloud computing system 202, in some implementations, the operations system 201 may not be cloud-based (e.g., may be implemented outside of a cloud computing system) or may be partially cloud-based. For example, the operations system 201 may include one or more devices that are not part of the cloud computing system 202, such as device 300 of FIG. 3, which may include a standalone server or another type of computing device. The operations system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

User device 230 includes one or more devices capable of receiving, generating, storing, processing, and/or providing information, as described elsewhere herein. User device 230 may include a communication device and/or a computing device. For example, user device 230 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 230 may communicate with one or more other devices of environment 200, as described elsewhere herein.

Entity system 240 includes one or more devices capable of receiving, generating, storing, processing, providing, and/or routing information, as described elsewhere herein. Entity system 240 may include a communication device and/or a computing device. For example, entity system 240 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. Entity system 240 may communicate with one or more other devices of environment 200, as described elsewhere herein.

Server device 250 includes one or more devices capable of receiving, generating, storing, processing, providing, and/or routing information, as described elsewhere herein. Server device 250 may include a communication device and/or a computing device. For example, server device 250 may include a server, such as an application server, a client server, a web server, a database server, a host server, a proxy server, a virtual server (e.g., executing on computing hardware), or a server in a cloud computing system. In some implementations, server device 250 includes computing hardware used in a cloud computing environment.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
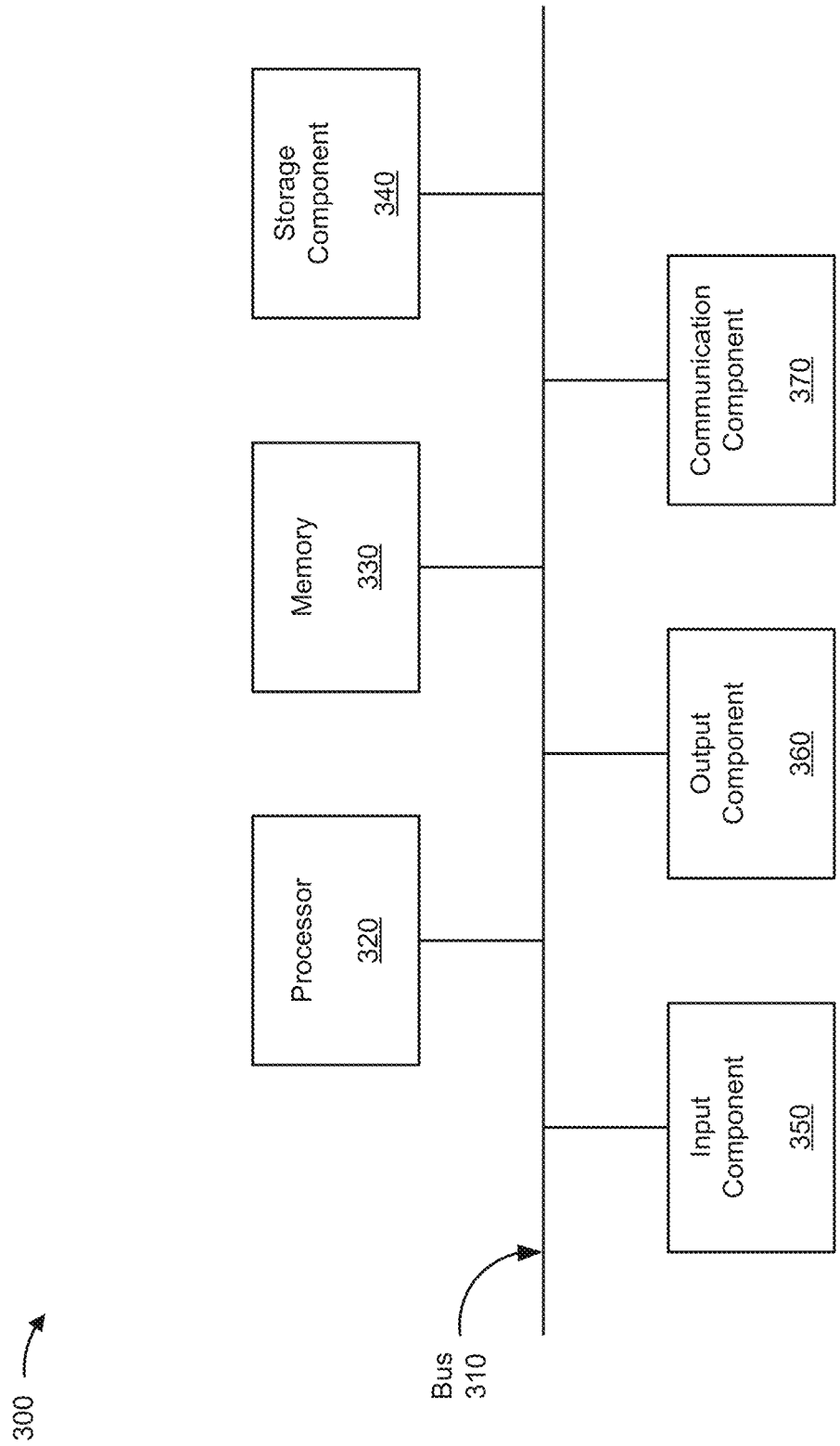
FIG. 3 is a diagram of example components of one or more devices of FIG. 2.

FIG. 3 is a diagram of example components of a device 300, which may correspond to operations system 201, user device 230, entity system 240, and/or server device 250. In some implementations, operations system 201, user device 230, entity system 240, and/or server device 250 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
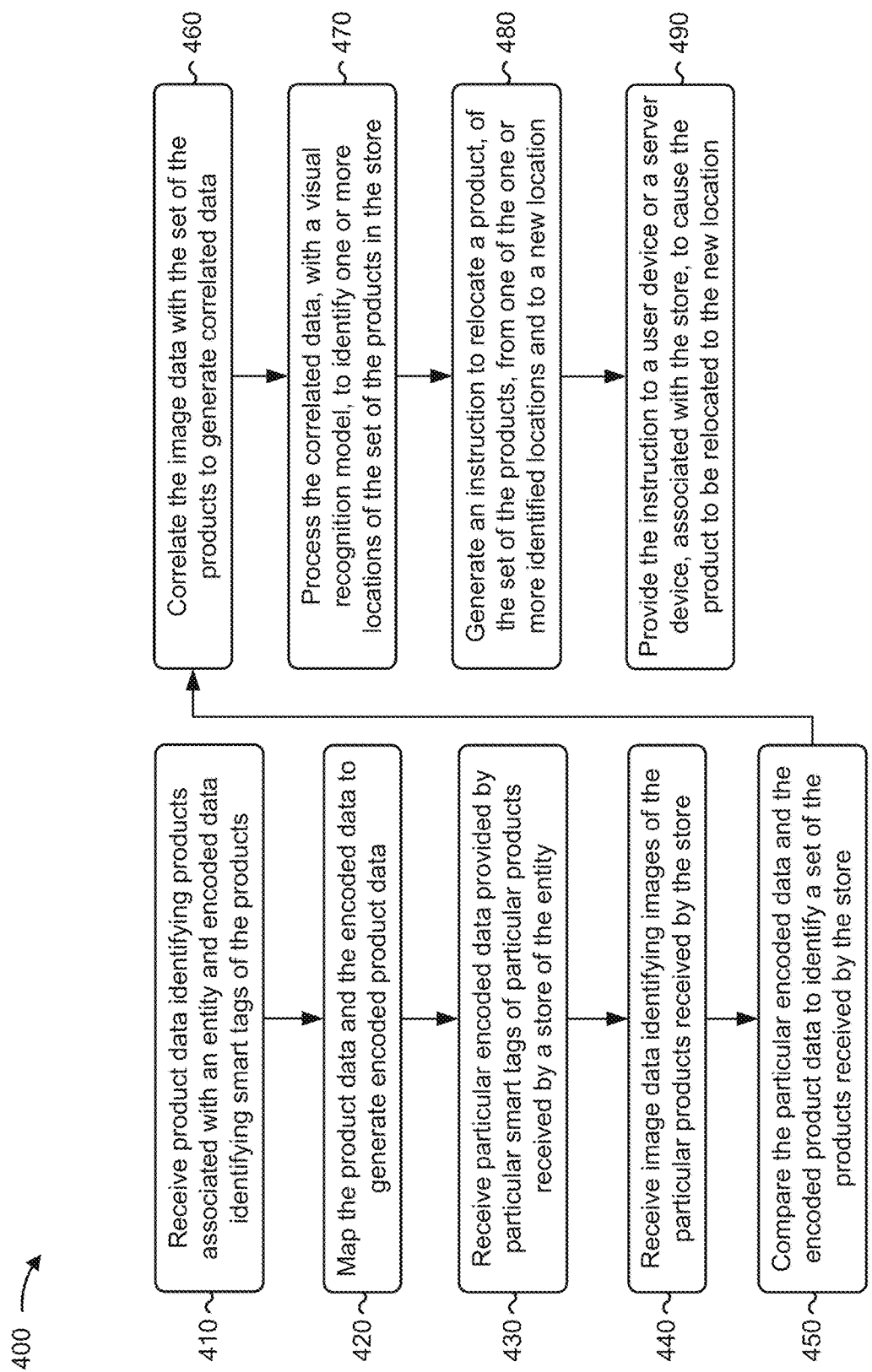
FIG. 4 is a flowchart of an example process for combining independent product monitoring systems to automatically manage product inventory and product pricing and automate store processes.

FIG. 4 is a flowchart of an example process 400 for combining independent product monitoring systems to automatically manage product inventory and product pricing and automate store processes. In some implementations, one or more process blocks of FIG. 4 may be performed by a device (e.g., operations system 201). In some implementations, one or more process blocks of FIG. 4 may be performed by another device or a group of devices separate from or including the device, such as a user device (e.g., user device 230) an entity system (e.g., entity system 240), and/or a server device (e.g., server device 250). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving product data identifying products associated with an entity and encoded data identifying smart tags of the products (block 410). For example, the device may receive product data identifying products associated with an entity and encoded data identifying smart tags of the products, as described above.

As further shown in FIG. 4, process 400 may include mapping the product data and the encoded data to generate encoded product data (block 420). For example, the device may map the product data and the encoded data to generate encoded product data, as described above. The device may store the encoded product data in a data structure associated with the device.

As further shown in FIG. 4, process 400 may include receiving particular encoded data provided by particular smart tags of particular products received by a store of the entity (block 430). For example, the device may receive particular encoded data provided by particular smart tags of particular products received by a store of the entity, as described above. In some implementations, the device may assign prices to the particular products when the particular encoded data is received. The device may provide data identifying the prices to a user device or a server device, associated with the store, to cause the user device or the server device to provide the data identifying the prices to the particular smart tags associated with particular products.

As further shown in FIG. 4, process 400 may include receiving image data identifying images of the particular products received by the store (block 440). For example, the device may receive image data identifying images of the particular products received by the store, as described above. In some implementations, the device may generate, based on the image data, a digital shelf user interface that includes the images of the set of the products. The device may provide the digital shelf user interface to a user device or a server device, associated with the store, to cause the user device or the server device to display the digital shelf user interface.

As further shown in FIG. 4, process 400 may include comparing the particular encoded data and the encoded product data to identify a set of the products received by the store (block 450). For example, the device may compare the particular encoded data and the encoded product data to identify a set of the products received by the store, as described above.

As further shown in FIG. 4, process 400 may include correlating the image data with the set of the products to generate correlated data (block 460). For example, the device may correlate the image data with the set of the products to generate correlated data, as described above.

As further shown in FIG. 4, process 400 may include processing the correlated data, with a visual recognition model, to identify one or more locations of the set of the products in the store (block 470). For example, the device may process the correlated data, with a visual recognition model, to identify one or more locations of the set of the products in the store, as described above. In some implementations, the device may generate a user interface that includes data identifying the one or more locations of the set of the products in the store and may provide the user interface to a user device or a server device associated with the store.

As further shown in FIG. 4, process 400 may include generating an instruction to relocate a product, of the set of the products, from one of the one or more identified locations and to a new location (block 480). For example, the device may generate an instruction to relocate a product, of the set of the products, from one of the one or more identified locations and to a new location, as described above. The new location may be associated with markdown products, products associated with a particular department, products associated with a particular size, and/or the like.

As further shown in FIG. 4, process 400 may include providing the instruction to a user device or a server device, associated with the store, to cause the product to be relocated to the new location (block 490). For example, the device may provide the instruction to a user device or a server device, associated with the store, to cause the product to be relocated to the new location, as described above.

In some implementations, the device may determine a price change for one or more products of the set of the products in the store. The device may generate an instruction to update one or more smart tags, of the one or more products, with the price change. The device may provide the instruction to a user device or a server device, associated with the store, to cause the user device or the server device to automatically update the one or more smart tags, of the one or more products, with the price change.

In some implementations, the device may receive transaction data and smart tag data associated with a product, of the set of the products in the store, to be sold. For example, the device may receive a notification indicating that a smart tag associated with a product, of the set of the products in the store, has been removed from the product in order to sell the product. The device may provide, based on the notification, a request for transaction data and smart tag data associated with the product. The device may receive the transaction data and the smart tag data associated with the product based on the request. The device may process the transaction data and the smart tag data to complete a sale of the product. The device may remove the smart tag data from the correlated data based on completing the sale of the product.

In some implementations, the device may receive smart tag data associated with a product, of the set of the products, that is moved to a physical location. The device may determine whether the physical location is within the store or outside the store based on the smart tag data. The device may provide data identifying the physical location to a user device or a server device, associated with the store, when the physical location is within the store. The device may generate a notification when the physical location is outside the store and may provide the notification to the user device or the server device to prevent theft of the product. Alternatively, and/or additionally, the device may provide the notification to a loss department or a security guard.

In some implementations, the device may provide a request for one or more battery statuses to the particular smart tags associated with the particular products received by the store. The device may receive, based on the request, the battery statuses of the particular smart tags. The device may identify, based on the battery statuses, one or more of the particular smart tags to have a battery issue. The device may cause the one or more of the particular smart tags to be replaced or provided with a new battery.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, product data identifying products associated with an entity and encoded data identifying smart tags of the products;
   mapping, by the device, the product data and the encoded data to generate encoded product data;
   receiving, by the device, particular encoded data provided by particular smart tags of particular products received by a store of the entity;
   receiving, by the device, image data identifying images of the particular products received by the store;
   comparing, by the device, the particular encoded data and the encoded product data to identify a set of the products received by the store;
   correlating, by the device, the image data with the set of the products to generate correlated data;
   processing, by the device, the correlated data, with a visual recognition model, to identify one or more locations of the set of the products in the store;
   generating, by the device, an instruction to relocate a product, of the set of the products, from one of the one or more identified locations and to a new location; and
   providing, by the device, the instruction to a user device or a server device, associated with the store, to cause the product to be relocated to the new location.

2. The method of claim 1, further comprising:
   storing the encoded product data in a data structure associated with the device.

3. The method of claim 1, further comprising:
   determining a price change for one or more products of the set of the products in the store;
   generating an instruction to update one or more smart tags, of the one or more products, with the price change; and
   providing the instruction to the user device or the server device, associated with the store, to cause the user device or the server device to automatically update the one or more smart tags, of the one or more products, with the price change.

4. The method of claim 1, further comprising:
   receiving transaction data and smart tag data associated with a product, of the set of the products in the store, to be sold;
   processing the transaction data and the smart tag data to complete a sale of the product; and
   removing the smart tag data from the correlated data based on completing the sale of the product.

5. The method of claim 1, further comprising:
   receiving smart tag data associated with a product, of the set of the products, that is moved to a physical location;
   determining whether the physical location is within the store or outside the store based on the smart tag data; and
   providing data identifying the physical location to the user device or the server device, associated with the store, when the physical location is within the store.

6. The method of claim 5, further comprising:
   generating a notification when the physical location is outside the store; and
   providing the notification to the user device or the server device to prevent theft of the product.

7. The method of claim 1, further comprising:
   assigning prices to the particular products when the particular encoded data is received; and providing data identifying the prices to the user device or the server device, associated with the store, to cause the user device or the server device to provide the data identifying the prices to the particular smart tags associated with particular products.

8. A device, comprising:

one or more memories; and one or more processors, communicatively coupled to the one or more memories, configured to:

receive product data identifying products associated with an entity and encoded data identifying smart tags of the products;

map the product data and the encoded data to generate encoded product data;

receive particular encoded data provided by particular smart tags of particular products received by a store of the entity;

receive image data identifying images of the particular products received by the store;

compare the particular encoded data and the encoded product data to identify a set of the products received by the store;

correlate the image data with the set of the products to generate correlated data;

process the correlated data, with a visual recognition model, to identify one or more locations of the set of the products in the store;

generate an instruction to relocate a product, of the set of the products, from one of the one or more identified locations and to a new location;

provide the instruction to a user device or a server device, associated with the store, to cause the product to be relocated to the new location;

assign prices to the particular products when the particular encoded data is received; and provide data identifying the prices to the user device or the server device, to cause the user device or the server device to provide the data identifying the prices to the particular smart tags associated with particular products.

9. The device of claim 8, wherein the new location is associated with one or more of:

markdown products, products associated with a particular department, or products associated with a particular size.

10. The device of claim 8, wherein the one or more processors are further configured to:

receive a notification indicating that a smart tag associated with a product, of the set of the products in the store, has been removed from the product in order to sell the product;

provide, based on the notification, a request for transaction data and smart tag data associated with the product;

receive, based on the request, the transaction data and the smart tag data;

process the transaction data and the smart tag data to complete a sale of the product; and remove the smart tag data from the correlated data based on completing the sale of the product.

11. The device of claim 8, wherein the one or more processors are further configured to:

provide a request for battery statuses to the particular smart tags associated with the particular products received by the store;

receive, based on the request, the battery statuses of the particular smart tags;

identify, based on the battery statuses, one or more of the particular smart tags having a battery issue; and cause the one or more of the particular smart tags to be replaced or provided with a new battery.

12. The device of claim 8, wherein the one or more processors are further configured to:

generate a user interface that includes data identifying the one or more locations of the set of the products in the store; and provide the user interface to the user device or the server device associated with the store.

13. The device of claim 8, wherein the one or more processors are further configured to:

receive smart tag data associated with a product, of the set of the products, that is moved to a physical location;

determine whether the physical location is outside the store based on the smart tag data;

generate a notification when the physical location is outside the store; and provide the notification to a loss department or a security guard.

14. The device of claim 8, wherein the one or more processors are further configured to:

generate, based on the image data, a digital shelf user interface that includes the images of the set of the products; and provide the digital shelf user interface to the user device or the server device, associated with the store, to cause the user device or the server device to display the digital shelf user interface.

15. A non-transitory computer-readable medium storing a set of instructions, the set of instructions comprising:

one or more instructions that, when executed by one or more processors of a device, cause the device to:

receive product data identifying products associated with an entity and encoded data identifying smart tags of the products;

map the product data and the encoded data to generate encoded product data;

receive particular encoded data provided by particular smart tags of particular products received by a store of the entity;

receive image data identifying images of the particular products received by the store;

compare the particular encoded data and the encoded product data to identify a set of the products received by the store;

correlate the image data with the set of the products to generate correlated data;

process the correlated data, with a visual recognition model, to identify one or more locations of the set of the products in the store;

determine a price change for one or more products of the set of the products in the store;

generate an instruction to update one or more smart tags, of the one or more products, with the price change; and provide the instruction to a user device or a server device, associated with the store, to cause the user device or the server device to automatically update the one or more smart tags, of the one or more products, with the price change.

16. The non-transitory computer-readable medium of claim 15, wherein the one or more instructions further cause the device to:

generate an instruction to relocate a product, of the set of the products, from one of the one or more identified locations and to a new location; and provide the instruction to the user device or the server device, associated with the store, to cause the product to be relocated to the new location.

17. The non-transitory computer-readable medium of claim 15, wherein the one or more instructions further cause the device to:

receive transaction data and smart tag data associated with a product, of the set of the products in the store, to be sold;

process the transaction data and the smart tag data to complete a sale of the product; and remove the smart tag data from the correlated data based on completing the sale of the product.

18. The non-transitory computer-readable medium of claim 15, wherein the one or more instructions further cause the device to:

receive smart tag data associated with a product, of the set of the products, that is moved to a physical location;

determine whether the physical location is within the store or outside the store based on the smart tag data;

provide data identifying the physical location to the user device or the server device, associated with the store, when the physical location is within the store;

generate a notification when the physical location is outside the store; and provide the notification to the user device or the server device to prevent theft of the product.

19. The non-transitory computer-readable medium of claim 15, wherein the one or more instructions further cause the device to:

assign prices to the particular products when the particular encoded data is received; and provide data identifying the prices to the user device or the server device, associated with the store, to cause the user device or the server device to provide the data identifying the prices to the particular smart tags of particular products.

20. The non-transitory computer-readable medium of claim 15, wherein the one or more instructions further cause the device to:

receive a notification indicating that a smart tag associated with a product, of the set of the products in the store, has been removed from the product in order to sell the product;

provide, based on the notification, a request for transaction data and smart tag data associated with the product;

receive, based on the request, the transaction data and the smart tag data;

process the transaction data and the smart tag data to complete a sale of the product; and remove the smart tag data from the correlated data based on completing the sale of the product.

* * * * *